United States Patent
Kakuko

(10) Patent No.: US 12,018,717 B2
(45) Date of Patent: Jun. 25, 2024

(54) BEARING CAP FOR BEARING DEVICE FOR VEHICLE WHEEL WITH ROTATIONAL SPEED DETECTION DEVICE, AND BEARING DEVICE FOR VEHICLE WHEEL WITH ROTATIONAL SPEED DETECTION DEVICE

(71) Applicant: NTN Corporation, Osaka (JP)

(72) Inventor: Tomoki Kakuko, Shizuoka (JP)

(73) Assignee: NTN CORPORATION, Osaka (JP)

( * ) Notice: Subject to any disclaimer, the term of this patent is extended or adjusted under 35 U.S.C. 154(b) by 36 days.

(21) Appl. No.: 17/799,350

(22) PCT Filed: Jan. 19, 2021

(86) PCT No.: PCT/JP2021/001715
§ 371 (c)(1),
(2) Date: Aug. 12, 2022

(87) PCT Pub. No.: WO2021/166524
PCT Pub. Date: Aug. 26, 2021

(65) Prior Publication Data
US 2023/0340989 A1    Oct. 26, 2023

(30) Foreign Application Priority Data
Feb. 21, 2020    (JP) ................. 2020-028074

(51) Int. Cl.
*F16C 19/18*    (2006.01)
*B60B 27/00*    (2006.01)
*F16C 41/00*    (2006.01)

(52) U.S. Cl.
CPC ........ *F16C 19/181* (2013.01); *B60B 27/0068* (2013.01); *B60B 27/0073* (2013.01);
(Continued)

(58) Field of Classification Search
CPC ...... F16C 19/186; F16C 33/723; F16C 35/00; F16C 35/04; F16C 41/007; F16C 2233/00; F16C 2326/02; B60B 27/0073
See application file for complete search history.

(56) References Cited

U.S. PATENT DOCUMENTS

| 9,970,485 B2 | 5/2018 | Takayama et al. |
| 2015/0198203 A1* | 7/2015 | Jung ...................... F16C 33/723 384/624 |

(Continued)

FOREIGN PATENT DOCUMENTS

| DE | 102012217030 | 3/2014 |
| JP | 2015-166612 | 9/2015 |

(Continued)

OTHER PUBLICATIONS

International Search Report dated Mar. 30, 2021 in corresponding International Application No. PCT/JP2021/001715.

*Primary Examiner* — Alan B Waits
(74) *Attorney, Agent, or Firm* — WENDEROTH, LIND & PONACK, L.L.P.

(57) ABSTRACT

In a bearing cap in which a sensor support part is formed on a bottom surface section of a cap body and in which an insertion hole for a rotational speed sensor is formed in the sensor support part, a recess that accommodates a tip portion of the rotational speed sensor is formed in the portion of the bottom surface section where the sensor support part is formed. The sensor support part includes a first wall section and a second wall section that are disposed, facing each other across a virtual line L passing through a center axis G1 of the bottom surface section and a center axis G2 of the insertion hole, and that are formed along the circumferential edge of the recess. Protrusions protruding from the bottom surface section are continuously provided on the outer (Continued)

circumferential surfaces of the first wall section and the second wall section.

4 Claims, 2 Drawing Sheets

(52) U.S. Cl.
CPC ............ *F16C 19/186* (2013.01); *F16C 41/00* (2013.01); *F16C 2233/00* (2013.01); *F16C 2326/02* (2013.01)

(56) References Cited

U.S. PATENT DOCUMENTS

| | | |
|---|---|---|
| 2015/0231922 A1 | 8/2015 | Kaiser et al. |
| 2018/0003238 A1 | 1/2018 | Takayama et al. |
| 2019/0293122 A1* | 9/2019 | Nakamura ............ F16C 19/186 |

FOREIGN PATENT DOCUMENTS

| | | | |
|---|---|---|---|
| JP | 2016-130100 | 7/2016 | |
| JP | 2016-136064 | 7/2016 | |
| JP | 2018-150966 | 9/2018 | |
| WO | 2014/044261 | 3/2014 | |
| WO | 2016/129554 | 8/2016 | |
| WO | WO-2016143891 A1 * | 9/2016 | ......... B60B 27/0068 |

\* cited by examiner

BEARING CAP FOR BEARING DEVICE FOR VEHICLE WHEEL WITH ROTATIONAL SPEED DETECTION DEVICE, AND BEARING DEVICE FOR VEHICLE WHEEL WITH ROTATIONAL SPEED DETECTION DEVICE

TECHNICAL FIELD

The present invention relates to a bearing cap for a bearing device for a vehicle wheel with a rotational speed detection device, and a bearing device for a vehicle wheel with a rotational speed detection device including the bearing cap.

BACKGROUND ART

There are known conventional bearing devices for vehicle wheels each of which serves as a bearing device for supporting a vehicle wheel of an automobile or the like and more specifically, rotatably supports, through a double-row rolling bearing, a hub ring to which a vehicle wheel is to be mounted.

One such bearing device for a vehicle wheel is a known bearing device for a vehicle wheel with a rotational speed detection device, which detects a rotational speed of a vehicle wheel in order to control an anti-lock braking system (ABS).

The rotational speed detection device includes a magnetic encoder that is integrated with a sealing device provided between an inner member and an outer member, and a rotational speed sensor that is disposed so as to face the magnetic encoder and that detects variation in magnetic poles of the magnetic encoder caused by rotation of the vehicle wheel.

The rotational speed sensor is disposed so as to face the encoder while the rotational speed sensor is mounted to a sensor support part that is formed on a bottomed cylindrical bearing cap, which is made of a resin and closes an opening on an inner side of the outer member.

In some cases, the sensor support part may have a shape whose bottom is closed in order to reduce entry of foreign matter into the bearing device.

Such a conventional bearing device for a vehicle wheel with a rotational speed detection device has excellent sealing properties over the entire rotational speed detection device. This is because, in a state where the rotational speed sensor is mounted to the sensor support part of the bearing cap, the inside of the sensor support part (more specifically, a space that is enclosed by an inner circumferential surface of the sensor support part and a tip portion of the mounted rotational speed sensor) is isolated from the outside, and there are few entry paths through which foreign matter such as moisture or mud enters inside the sensor support part.

However, it is difficult to discharge foreign matter that has once entered inside the sensor support part to the outside of the sensor support part. Thus, the foreign matter such as moisture or mud that has accumulated on the bottom may freeze. Then, this may cause damage to the tip portion of the rotational speed sensor or the bottom.

Therefore, a technique for solving such a problem is disclosed in Patent Literature 1.

That is, Patent Literature 1 discloses a bearing cap that is made of a resin and that has a sensor support part into which a rotational speed sensor is mounted. In the sensor support part, a bottomed insertion hole into which the rotation sensor is inserted is formed so as to extend in an axial direction. Four corners in cross-sectional view of the insertion hole are expanded in a radial direction.

CITATIONS LIST

Patent Literature

Patent Literature 1: WO-A1 2014/044261 Gazette

SUMMARY OF INVENTION

Technical Problems

However, in the bearing cap disclosed in Patent Literature 1, the insertion hole of the sensor support part is opened only in the axial direction at the four corners in cross-sectional view. Thus, for example, when foreign matter such as moisture or mud has entered inside the sensor support part, the moisture is discharged to the outside through the four corners in cross-sectional view of the insertion hole, but the foreign matter such as mud is likely to accumulate inside the sensor support part without being completely discharged to the outside. Therefore, it is difficult to efficiently discharge foreign matter that has entered inside the sensor support part to the outside.

It is an object of the present invention to provide a bearing cap for a bearing device for a vehicle wheel with a rotational speed detection device that is capable of efficiently discharging, outside a sensor support part, foreign matter having entered inside the sensor support part, and that ensures rigidity of the sensor support part, and a bearing device for a vehicle wheel with a rotational speed detection device.

Solutions to Problems

That is, a bearing cap for a bearing device for a vehicle wheel with a rotational speed detection device according to one aspect of the present invention includes a cap body having a bottomed cylindrical shape and formed by injection-molding a synthetic resin, and a core metal integrally molded in an opening of the cap body. A sensor support part that protrudes outward in an axial direction is integrally formed on an outside surface in the axial direction of a bottom surface section of the cap body. An insertion hole into which a rotational speed sensor is adapted to be mounted is formed in the sensor support part so as to extend in the axial direction. In the bearing cap, a recess that is adapted to accommodate a tip portion of the rotational speed sensor is formed so as to be continuously connected to the insertion hole, in a portion on the outside surface of the bottom surface section where the sensor support part is formed. The sensor support part includes a first wall section and a second wall section that are disposed, facing each other across a virtual line passing through a center axis of the bottom surface section and a center axis of the insertion hole, and that are formed along a circumferential edge of the recess. Respective protrusions that protrude outward in a radial direction of the sensor support part and that protrude in the axial direction from the outside surface of the bottom surface section are continuously provided on an outer circumferential surface of the first wall section and on an outer circumferential surface of the second wall section, and have a protruding dimension in the axial direction that is shorter than a protruding dimension in the axial direction of the sensor support part.

A bearing device for a vehicle wheel with a rotational speed detection device according to another aspect of the present invention includes an outer member, an inner member, double-row rolling elements, a pulser ring, and a rotational speed sensor. The outer member has double-row outer raceway surfaces formed on an inner circumference of the outer member. The inner member includes a hub ring having a small diameter stepped portion that is formed on an outer circumference of the hub ring and that extends in an axial direction, and at least one inner ring press-fitted onto the small diameter stepped portion. The inner member has double-row inner raceway surfaces that are formed on an outer circumference of the inner member and that face the double-row outer circumferential raceway surfaces. The double-row rolling elements are rollably contained between the respective raceway surfaces of the outer member and the inner member. The pulser ring is fitted onto the inner ring and has a magnetic property that changes alternately at an equal interval along a circumferential direction. The rotational speed sensor is adapted to be disposed, facing the pulser ring through an air gap. The bearing device further includes the bearing cap according to any one of first to third aspects of the present invention that is adapted to be mounted to an end portion on an inner side of the outer member.

Advantageous Effects of Invention

The present invention has the following effects.

That is, in the bearing cap for a bearing device for a vehicle wheel with a rotational speed detection device and the bearing device for a vehicle wheel with a rotational speed detection device including the bearing cap according to the aspects of the present invention, the sensor support part includes the first wall section and the second wall section that are disposed, facing each other across the virtual line passing through the center axis of the bottom surface section of the cap body and the center axis of the insertion hole into which the rotational speed sensor is adapted to be mounted, and that are formed along the circumferential edge of the recess adapted to accommodate the tip portion of the rotational speed sensor.

Thus, the sensor support part is formed with openings that are gaps between the first wall section and the second wall section and that extend in the axial direction. When foreign matter such as moisture or mud has entered inside the sensor support part, the foreign matter can be efficiently discharged outside the sensor support part through the openings.

Further, the respective protrusions are continuously provided on the outer circumferential surface of the first wall section and the outer circumferential surface of the second wall section that form the sensor support part. The protrusions protrude outward in the radial direction of the sensor support part and protrude in the axial direction from the outside surface of the bottom surface section of the cap body. The protrusions have the protruding dimension in the axial direction that is shorter than the protruding dimension in the axial direction of the sensor support part. Thus, rigidity of each of the first wall section and the second wall section is ensured by each of the protrusions.

That is, by providing the protrusions, it is possible to ensure rigidity of the sensor support part including the first wall section and the second wall section.

BRIEF DESCRIPTION OF DRAWINGS

FIGS. 2A and 2B are views illustrating a configuration of the bearing cap according to the present invention, in which FIG. 2A is a front view of the bearing cap, and FIG. 2B is a cross-sectional side view as viewed in the direction of arrows II in FIG. 2A.

DESCRIPTION OF EMBODIMENT

Figure 1:
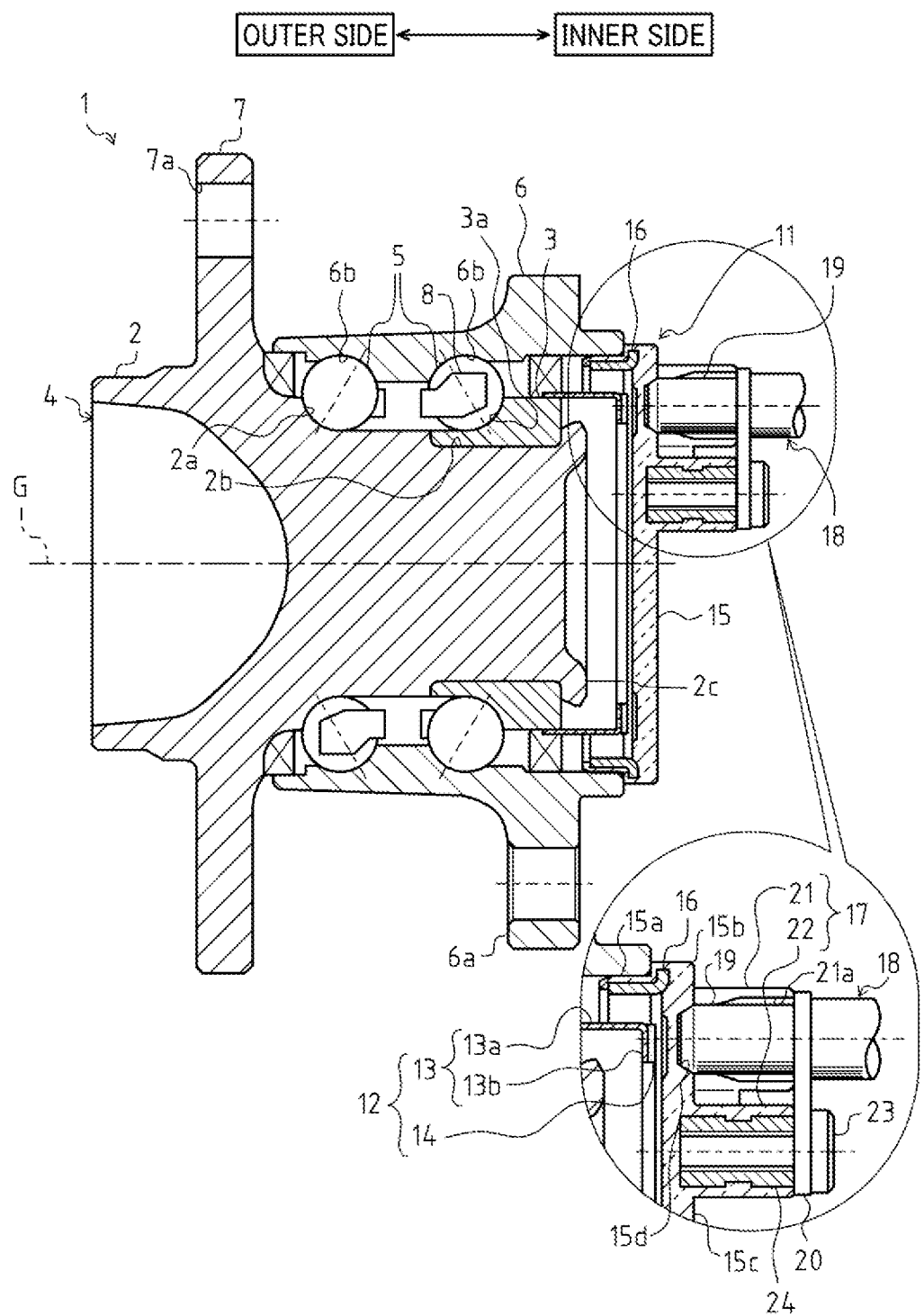
FIG. 1 is a cross-sectional side view illustrating an overall configuration of a bearing device for a vehicle wheel with a rotational speed detection device including a bearing cap, according to the present invention.

Next, an embodiment of a bearing cap 11 and a bearing device for a vehicle wheel 1 with a rotational speed detection device according to the present invention will be described with reference to FIGS. 1 and 2.

Herein, for convenience, description will be made based on the outer side and the inner side defined by the directions of the arrows illustrated in FIGS. 1 and 2.

The "outer side" represents a direction oriented toward a side of a vehicle wheel, which is rotatably supported by the bearing device for a vehicle wheel 1 with a rotational speed detection device, with respect to the bearing device for a vehicle wheel 1 in a state of being mounted to a vehicle body of an automobile or the like. The "inner side" represents a direction opposite to the outer side, that is, a direction oriented toward the inner side of a vehicle body, with respect to the bearing device for a vehicle wheel 1 with a rotational speed detection device in a state of being mounted to the vehicle body of an automobile or the like.

Herein, a direction parallel to a rotational axis G (see FIG. 1) of the bearing device for a vehicle wheel 1 with a rotational speed detection device is defined as an "axial direction". A direction orthogonal to the rotational axis G of the bearing device for a vehicle wheel 1 is defined as a "radial direction". A direction along an arc centered on the rotational axis G of the bearing device for a vehicle wheel 1 is defined as a "circumferential direction".

[Overall Configuration of Bearing Device for Vehicle Wheel 1 with Rotational Speed Detection Device]

First, an overall configuration of the bearing device for a vehicle wheel 1 with a rotational speed detection device in the present embodiment will be described with reference to FIG. 1.

The bearing device for a vehicle wheel 1 with a rotational speed detection device (which is hereinafter also simply referred to as the "bearing device for a vehicle wheel 1") is a third generation type used for a driven wheel. The bearing device for a vehicle wheel 1 includes an inner member 4 having a hub ring 2 and an inner ring 3, and an outer member 6 fitted onto the inner member 4 through double-row rolling elements (balls) 5, 5.

The hub ring 2 is integrally formed, on an end portion on the outer side thereof, with a vehicle wheel mounting flange 7, to which a vehicle wheel (not illustrated) is adapted to be mounted. Bolt holes 7a are formed at circumferentially equidistant positions in the vehicle wheel mounting flange 7. The bolt holes 7a are formed for fixing hub bolts (not illustrated) that are used for fastening a wheel or the like of the vehicle wheel to the hub ring 2.

One (outer side) inner raceway surface 2a is formed on an outer circumference of the hub ring 2. A cylindrical small diameter stepped portion 2b is also formed on the outer circumference of the hub ring 2, and extends from the inner raceway surface 2a toward the inner side.

The inner ring 3 is press-fitted onto the small diameter stepped portion 2b of the hub ring 2, and has the other (inner side) inner raceway surface 3a formed on an outer circumference of the inner ring 3. A caulked portion 2c, plastically deformed outward in the radial direction, is formed at an end portion of the small diameter stepped portion 2b. The caulked portion 2c fixes the inner ring 3 in the axial direction to the hub ring 2 in a state where a predetermined bearing preload is applied to the inner ring 3.

The outer member 6 is integrally formed, on an outer circumference thereof, with a vehicle body mounting flange 6a, which is adapted to be mounted to a knuckle (not illustrated). The outer member 6 has, on an inner circumference thereof, double-row outer raceway surfaces 6b, 6b, which face the double-row inner raceway surfaces 2a, 3a.

The double-row rolling elements 5, 5 are contained between the outer raceway surfaces 6b, 6b of the outer member 6 and the double-row inner raceway surfaces 2a, 3a facing the outer raceway surfaces 6b, 6b, and are rollably held by cages 8, 8.

Further, the bottomed cylindrical bearing cap 11, made of a synthetic resin, is mounted to an open end portion on the inner side of the outer member 6. The bearing cap 11 closes an opening on the inner side of the outer member 6. This prevents rainwater, dust, or the like from entering inside the bearing device for a vehicle wheel 1 from the outside.

A pulser ring 12 is fitted onto the outer circumference of the inner ring 3.

The pulser ring 12 includes a support ring 13 formed in an annular shape, and a magnetic encoder 14 bonded by vulcanization to a side surface of the support ring 13.

The magnetic encoder 14 is formed of an elastomer such as rubber, which includes mingled magnetic powder such as ferrite, such that magnetic poles N, S are magnetized alternately at equal intervals along the circumferential direction, thereby changing magnetic properties. The magnetic encoder 14 thus forms a rotary encoder for detecting a rotational speed of a vehicle wheel.

The support ring 13 is formed in a substantially L-shape in cross section by, for example, pressing a ferromagnetic steel sheet. The support ring 13 has a cylindrical fitting section 13a fitted onto the inner ring 3, and an upright plate section 13b extending inward in the radial direction from an end portion on the inner side of the fitting section 13a.

The magnetic encoder 14 is bonded to the side surface on the inner side of the upright plate section 13b.

As described above, the bearing cap 11 is fitted inside and fixed to the open end portion on the inner side of the outer member 6 to close the opening of the outer member 6.

The bearing cap 11 includes a cap body 15 having a bottomed cylindrical shape. A mounting portion 17, protruding toward the inner side, is provided on a radially outer portion of the cap body 15.

Details of the configuration of the bearing cap 11 will be described later.

When a sensor unit 18 is mounted to the mounting portion 17 of the bearing cap 11, a rotational speed sensor 19, provided in the sensor unit 18, is disposed, facing the magnetic encoder 14 of the pulser ring 12 through a predetermined air gap.

The sensor unit 18 includes the rotational speed sensor 19, an integrated circuit (IC), and the like. The rotational speed sensor 19 includes a magnetic detection element such as a Hall element or a magnetoresistance element (MR element) that changes properties in accordance with a flowing direction of a magnetic flux. The IC includes a waveform shaping circuit (not illustrated) incorporated therein that adjusts an output waveform of the magnetic detection element. The sensor unit 18 forms part of an anti-lock braking system (ABS) of an automobile for detecting and controlling a rotational speed of a vehicle wheel.

As described above, the illustrated bearing device for a vehicle wheel 1 in the present embodiment is a bearing device for a vehicle wheel used for a driven wheel, which is formed by a double-row angular ball bearing using balls for the rolling elements 5. However, the present invention is not limited to this. The bearing device for a vehicle wheel 1 may be formed by a double-row tapered roller bearing using tapered rollers for the rolling elements 5.

Although the third generation structure has been illustrated, the present invention is not limited to this, as long as a bearing device for a vehicle wheel is an inner ring rotation type provided on a driven wheel side. Although not illustrated, the present invention may be applied to a bearing device for a vehicle wheel with a so-called second generation structure, in which a pair of inner rings is press-fitted onto a small diameter stepped portion of a hub ring.

[Configuration of Bearing Cap 11]

Next, a detailed configuration of the bearing cap 11 in the present embodiment will be described with reference to FIGS. 1 and 2.

As illustrated in FIG. 1, the bearing cap 11 includes the cap body 15 having a bottomed cylindrical shape and formed by injection-molding a synthetic resin, and a core metal 16 integrally molded in an opening of the cap body 15.

The cap body 15 made of a synthetic resin may be directly mounted to the outer member 6 without providing the core metal 16. However, when the core metal 16 is provided, this increases strength and rigidity of the bearing cap 11 to improve pullout resistance. This also improves airtightness of a fitting section.

The cap body 15 is formed by injection-molding, for example, a non-magnetic special ether-based synthetic resin material such as polyphenylene sulfide (PPS), to which fibrous reinforcing material such as glass fiber is added.

The core metal 16 is formed in an annular shape having an L-shaped cross section by press-forming a stainless steel sheet, a cold-rolled steel sheet, or the like, for example.

The cap body 15 includes a fitting section 15a, a flange section 15b, and a bottom surface section 15c. The fitting section 15a has a cylindrical shape, and is fitted inside an inner circumference of the end portion on the inner side of the outer member 6. The flange section 15b is provided outward in the radial direction from the fitting section 15a, and abuts on an end surface on the inner side of the outer member 6. The bottom surface section 15c has a flat shape, and is provided radially inside the flange section 15b.

The mounting portion 17, protruding from the bottom surface section 15c toward the inner side, is integrally formed on the radially outer portion of an outside surface of the bottom surface section 15c.

The mounting portion 17 includes a sensor support part 21 to which the sensor unit 18 is adapted to be mounted, and a fixing part 22 to which a holding member 20 described later is adapted to be fixed by a fixing bolt 23.

Figure 2B:
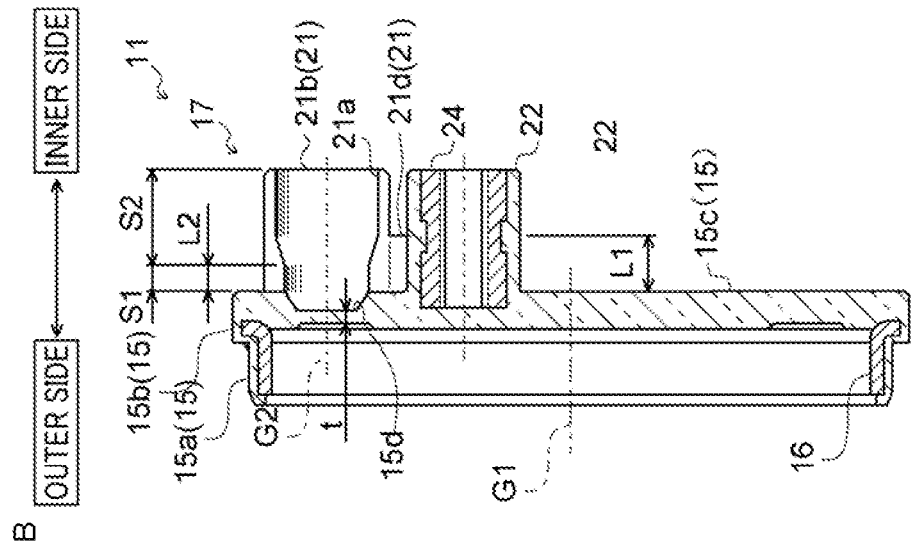

The sensor support part 21 protrudes outward (toward the inner side) in the axial direction (a direction of a center axis G1 of the bearing cap 11 illustrated in FIG. 2B, the same applies hereafter) from the outside surface in the axial direction of the bottom surface section 15c (in the present embodiment, a surface on the inner side of the bottom surface section 15c) of the cap body 15.

The fixing part 22 is adjacent to a radially inner side of the sensor support part 21, and protrudes toward the inner side in parallel with the sensor support part 21.

An insertion hole 21a, into which the rotational speed sensor 19 of the sensor unit 18 is adapted to be mounted, is formed in the sensor support part 21 so as to extend in the axial direction.

The insertion hole 21a is arranged at a position corresponding to a position of the magnetic encoder 14 of the pulser ring 12.

A recess 15d, adapted to accommodate a tip portion of the rotational speed sensor 19, is formed so as to be continuously connected to the insertion hole 21a, in a portion on the outside surface of the bottom surface section 15c where the sensor support part 21 is formed. With the recess 15d, the insertion hole 21a is formed as a non-through hole having a bottom.

The fixing part 22 accommodates a fastening member for fastening and fixing the rotational speed sensor 19.

Specifically, a nut 24, into which the fixing bolt 23 is adapted to be screwed, is embedded in the fixing part 22 by insert molding.

In the mounting portion 17 with such a configuration, by insertion of the rotational speed sensor 19 into the insertion hole 21a of the sensor support part 21, the rotational speed sensor 19 is disposed, facing the pulser ring 12 through the recess 15d of the bottom surface section 15c.

The rotational speed sensor 19, having been inserted into the sensor support part 21, is inserted through and held by one end portion of the holding member 20 formed of a plate-shaped member. By fixing the other end portion of the holding member 20 to the fixing part 22 using the fixing bolt 23, the rotational speed sensor 19 is firmly held in the insertion hole 21a of the sensor support part 21 through the holding member 20.

A wall thickness t (see FIG. 2B) of the recess 15d, formed in the bottom surface section 15c of the cap body 15, is set within a range of 0.1 to 1.0 mm.

It is not preferable to set the wall thickness t to less than 0.1 mm because strength and rigidity are insufficient and thus there is a risk of deformation due to collision with other parts during the assembly. It is also not preferable to allow the wall thickness t to exceed 1.0 mm because the air gap becomes too large and thus a necessary magnetic flux density cannot be obtained.

Figure 2A:
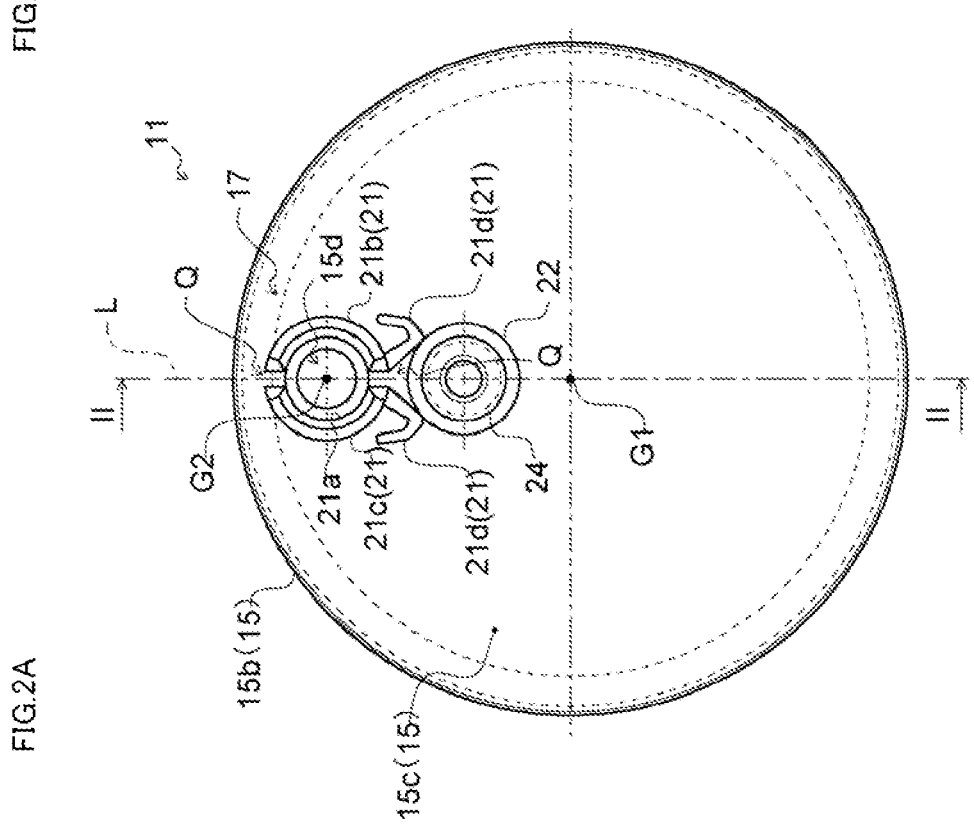

In the present embodiment, as illustrated in FIG. 2A, the sensor support part 21 is formed along a circumferential edge of the recess 15d excluding an upper end side, and a lower end side (that is, an end portion facing the road surface side) of the recess 15d.

Specifically, the sensor support part 21 includes a first wall section 21b and a second wall section 21c each having a C-shape in cross-sectional view and protruding in the axial direction. The first wall section 21b and the second wall section 21c are disposed, facing each other across a virtual line L passing through the center axis G1 of the bottom surface section 15c of the cap body 15 and a center axis G2 of the insertion hole 21a, and are formed along the circumferential edge of the recess 15d.

Respective protrusions 21d, 21d are continuously provided on a lower end portion on an outer circumferential surface of the first wall section 21b and on a lower end portion on an outer circumferential surface of the second wall section 21c. The protrusions 21d, 21d protrude outward in the radial direction of the sensor support part 21, and also protrude in the axial direction from the outside surface (the surface on the inner side) of the bottom surface section 15c. The protrusions 21d, 21d have a protruding dimension in the axial direction that is shorter than that of the sensor support part 21.

With such a configuration, respective openings Q, Q are formed in an upper end side and a lower end side of the sensor support part 21. The openings Q, Q are gaps between the first wall section 21b and the second wall section 21c, and extend in the axial direction.

With this formation, even when foreign matter such as moisture or mud has entered inside the sensor support part 21, the foreign matter can be efficiently discharged outside the sensor support part 21 through the openings Q, Q.

The respective protrusions 21d, 21d are continuously provided on the outer circumferential surface of the first wall section 21b and on the outer circumferential surface of the second wall section 21c that form the sensor support part 21. Thus, rigidity of each of the first wall section 21b and the second wall section 21c is ensured by each of the protrusions 21d, 21d.

That is, by providing the protrusions 21d, 21d, it is possible to ensure rigidity of the sensor support part 21 including the first wall section 21b and the second wall section 21c.

As illustrated in FIG. 2B, inside diameters of the insertion hole 21a in the present embodiment are set as follows. An inside diameter of the insertion hole 21a in a first region S1 is set to a dimension that corresponds to and is the same degree as an outside diameter of the rotational speed sensor 19 (see FIG. 1). Here, the first region S1 is a region that extends from an intermediate portion in the axial direction to a base end portion of the sensor support part 21. An inside diameter of the insertion hole 21a in a second region S2 is set to be increased compared to the inside diameter of the insertion hole 21a in the first region S1. Here, the second region S2 is a region that extends from the intermediate portion in the axial direction to a protruding end portion (an end portion on the inner side) of the sensor support part 21.

Cross-sectional area of the insertion hole 21a is not limited to that in the present embodiment, and may be set to the same degree as cross-sectional area of the rotational speed sensor 19 over the entire regions in the axial direction.

However, as in the present embodiment, when the cross-sectional area of the insertion hole 21a of the sensor support part 21 is set to be increased in diameter in the region extending from the intermediate portion in the axial direction to the protruding end portion of the sensor support part 21, it is possible to easily insert the rotational speed sensor 19 into the insertion hole 21a of the sensor support part 21 when the rotational speed sensor 19 is mounted.

Further, a gap is formed between the outer circumferential surface of the rotational speed sensor 19 mounted to the sensor support part 21 and the region having the increased diameter on an inner circumferential surface of the insertion hole 21a. Thus, foreign matter that has entered inside the sensor support part 21 can be more efficiently discharged to the outside through the gap.

In the present embodiment, the protruding dimension L1 in the axial direction of the respective protrusions 21d, 21d, continuously provided on the outer circumferential surface of the first wall section 21b and on the outer circumferential surface of the second wall section 21c, is set to be larger than a dimension L2 in the axial direction of the first region S1 (L1>L2) in which the cross-sectional area of the insertion hole 21a is set to the same degree as the outside diameter of the rotational speed sensor 19, as described above.

With such a configuration, it is possible to more reliably ensure the rigidity of the sensor support part 21, with respect to the first region S1 in which the mounted rotational speed sensor 19 is supported inside the inner circumferential surface of the sensor support part 21 while contact is made between the inner circumferential surface of the sensor support part 21 and the outer circumferential surface of the rotational speed sensor 19.

An embodiment of the present invention has been described above. However, the embodiment is merely illustrative, and thus the present invention is not limited to such an embodiment. It is needless to say that the present invention can be further practiced in various embodiments without departing from the gist of the present invention. The scope of the present invention is indicated by the recitation of the claims, and includes the meaning equivalent to the recitation of the claims and all modifications within the scope.

INDUSTRIAL APPLICABILITY

The present invention is applicable to a bearing cap for a bearing device for a vehicle wheel with a rotational speed detection device, and a bearing device for a vehicle wheel with a rotational speed detection device including the bearing cap.

REFERENCE SIGNS LIST 1 bearing device for vehicle wheel with rotational speed detection device (bearing device for vehicle wheel)
2 hub ring
2a inner raceway surface
2b small diameter stepped portion
3 inner ring
3a inner raceway surface
4 inner member
5 rolling element
6 outer member
6b outer raceway surface
11 bearing cap
12 pulser ring
15 cap body
15c bottom surface section
15d recess
16 core metal
19 rotational speed sensor
21 sensor support part
21a insertion hole
21b first wall section
21c second wall section
21d protrusion
G1 center axis of bottom surface section
G2 center axis of insertion hole
L virtual line
L1 protruding dimension
S1 first region
S2 second region

The invention claimed is:
1. A bearing cap for a bearing device for a vehicle wheel with a rotational speed detection device, the bearing cap comprising:
a cap body having a bottomed cylindrical shape and formed by injection-molding a synthetic resin; and
a core metal integrally molded in an opening of the cap body,
a sensor support part that protrudes outward in an axial direction being integrally formed on an outside surface in the axial direction of a bottom surface section of the cap body,
an insertion hole into which a rotational speed sensor is adapted to be mounted being formed in the sensor support part so as to extend in the axial direction,
wherein a recess that is adapted to accommodate a tip portion of the rotational speed sensor is formed so as to be continuously connected to the insertion hole, in a portion on the outside surface of the bottom surface section where the sensor support part is formed,
wherein the sensor support part includes a first wall section and a second wall section that are disposed, facing each other across a virtual line passing through a center axis of the bottom surface section and a center axis of the insertion hole, and that are formed along a circumferential edge of the recess, and
wherein respective protrusions that protrude outward in a radial direction of the sensor support part and that protrude in the axial direction from the outside surface of the bottom surface section are continuously provided on an outer circumferential surface of the first wall section and on an outer circumferential surface of the second wall section, and have a protruding dimension in the axial direction that is shorter than a protruding dimension in the axial direction of the sensor support part.

2. The bearing cap for a bearing device for a vehicle wheel with a rotational speed detection device according to claim 1, wherein in the sensor support part, an inside diameter of the insertion hole in a first region that extends from an intermediate portion in the axial direction to a base end portion of the sensor support part is set to a dimension that corresponds to an outside diameter of the rotational speed sensor, and an inside diameter of the insertion hole in a second region that extends from an intermediate portion in the axial direction to a protruding end portion of the sensor support part is set to be increased compared to an inside diameter of an insertion hole in a first region.

3. The bearing cap for a bearing device for a vehicle wheel with a rotational speed detection device according to claim 2, wherein the protruding dimension of the respective protrusions is set to be larger than a dimension in the axial direction of the first region.

4. A bearing device for a vehicle wheel with a rotational speed detection device, the bearing device comprising:
an outer member having double-row outer raceway surfaces formed on an inner circumference of the outer member;
an inner member including:
a hub ring having a small diameter stepped portion that is formed on an outer circumference of the hub ring and that extends in an axial direction; and
at least one inner ring press-fitted onto the small diameter stepped portion,
the inner member having double-row inner raceway surfaces that are formed on an outer circumference of the inner member and that face the double-row outer circumferential raceway surfaces;
double-row rolling elements rollably contained between the respective raceway surfaces of the outer member and the inner member;

a pulser ring fitted onto the inner ring and having a magnetic property that changes alternately at an equal interval along a circumferential direction; and
a rotational speed sensor adapted to be disposed, facing the pulser ring through an air gap,
wherein the bearing device further comprises the bearing cap according to claim 1 that is adapted to be mounted to an end portion on an inner side of the outer member.

* * * * *